(12) United States Patent
Self et al.

(10) Patent No.: US 8,647,401 B2
(45) Date of Patent: Feb. 11, 2014

(54) STEAM REFORMATION SYSTEM

(75) Inventors: John Self, Cullman, AL (US); Robert A. Olexy, Parrish, FL (US); Steve Cochran, Baton Rouge, LA (US)

(73) Assignee: Shaw Intellectual Property Holdings, Inc., Baton Rouge, LA (US)

( * ) Notice: Subject to any disclaimer, the term of this patent is extended or adjusted under 35 U.S.C. 154(b) by 1912 days.

(21) Appl. No.: 11/713,440

(22) Filed: Mar. 2, 2007

(65) Prior Publication Data

US 2007/0204512 A1 Sep. 6, 2007

Related U.S. Application Data

(60) Provisional application No. 60/779,247, filed on Mar. 2, 2006.

(51) Int. Cl.
- *B01J 7/00* (2006.01)
- *C10B 1/00* (2006.01)
- *C10J 3/00* (2006.01)
- *C01B 6/24* (2006.01)

(52) U.S. Cl.
USPC .................. 48/89; 48/61; 48/210; 48/197 R; 423/644; 219/600

(58) Field of Classification Search
USPC ............................................ 48/61; 219/600
See application file for complete search history.

(56) References Cited

U.S. PATENT DOCUMENTS

| | | |
|---|---|---|
| 3,714,911 A | 2/1973 | Pradt |
| 4,437,417 A | 3/1984 | Roberts |
| 4,602,140 A | 7/1986 | Sobolewski |
| 4,874,587 A | 10/1989 | Galloway |
| 5,134,944 A | 8/1992 | Keller et al. |
| 5,184,950 A | 2/1993 | Fraysse et al. |
| 5,262,621 A | 11/1993 | Hu et al. |
| 5,273,556 A | 12/1993 | McMahon et al. |
| 5,286,942 A | 2/1994 | McFadden et al. |
| 5,319,170 A | 6/1994 | Cassidy |
| 5,334,819 A | 8/1994 | Lin |
| 5,362,468 A | 11/1994 | Coulon et al. |
| 5,541,386 A | 7/1996 | Alvi et al. |
| 5,550,312 A | 8/1996 | Schingnitz et al. |
| 5,602,297 A | 2/1997 | Wang |
| 5,710,360 A | 1/1998 | Self et al. |
| 5,821,111 A | 10/1998 | Grady et al. |
| 5,958,273 A | 9/1999 | Koch et al. |

(Continued)

FOREIGN PATENT DOCUMENTS

| | | |
|---|---|---|
| GB | 2210286 A | 7/1989 |
| WO | WO 2006076801 A1 * | 7/2006 |

*Primary Examiner* — Matthew Merkling
(74) *Attorney, Agent, or Firm* — Kean Miller LLP

(57) ABSTRACT

A gasification system and method for converting organic materials into a usable syngas are provided. The gasification system includes a kiln for receiving a feedstock; a means for heating the kiln; a steam reforming reactor; and means for inductively heating the steam reforming reactor to drive the gasification reactions. In one preferred embodiment, the fuel processing system includes a steam reforming reactor that is at least partially filled with thermal transmitters which receive electromagnetic energy and generate heat within the steam reforming reactor. The organic material to be used as feedstock may include but will not be limited to petrochemical streams, refinery streams, natural gas, crude oil, coal, plastics, municipal wastes, toxic and hazardous wastes, biomass, medical wastes, and automobile wastes. The syngas that is produced in this process may consist primarily of hydrogen, carbon monoxide, carbon dioxide and methane.

12 Claims, 3 Drawing Sheets

(56) References Cited

U.S. PATENT DOCUMENTS

| | | | |
|---|---|---|---|
| 5,990,465 A * | 11/1999 | Nakaoka et al. | 219/629 |
| 6,018,090 A | 1/2000 | Schmidt | |
| 6,084,147 A | 7/2000 | Mason | |
| 6,118,111 A | 9/2000 | Price et al. | |
| 6,187,465 B1 | 2/2001 | Galloway | |
| 6,190,429 B1 | 2/2001 | Fujimura et al. | |
| 6,213,029 B1 | 4/2001 | Potter et al. | |
| 6,376,738 B1 | 4/2002 | Kashiwagi et al. | |
| 6,398,921 B1 | 6/2002 | Moraski | |
| 6,455,011 B1 | 9/2002 | Fujimura et al. | |
| 6,504,136 B2 | 1/2003 | Snowball | |
| 6,619,218 B2 | 9/2003 | Tsuruta | |
| 6,709,602 B2 | 3/2004 | Spritzer et al. | |
| 6,837,910 B1 | 1/2005 | Yoshikawa et al. | |
| 6,902,711 B1 | 6/2005 | Fujimura et al. | |
| 7,022,953 B2 | 4/2006 | Nguyen et al. | |
| 7,070,743 B2 | 7/2006 | Blackwell et al. | |
| 2005/0039651 A1 * | 2/2005 | Cole et al. | 110/341 |

* cited by examiner ered a subcategory of gasification and involves the high temperature chemical breakdown of organic compounds in a low oxygen or oxygen-free environment. The steam reformation process is an endothermic process whereby organic materials in combination with water vapor are converted into a syngas. As an endothermic process, steam reforming thereby requires an energy input to drive the steam reformation reaction.

STEAM REFORMATION SYSTEM

CROSS REFERENCE TO RELATED APPLICATIONS

This application claims the benefit of prior U.S. provisional application Ser. No. 60/779,247 filed on Mar. 2, 2006 which is hereby incorporated by reference in its entirety.

BACKGROUND

The present invention relates to a method and apparatus for converting organic materials into a usable synthetic gas (syngas) by way of gasification and more particularly to a method and apparatus for converting organic materials into a usable syngas by way of steam reformation with the use of induction generated heat.

Various types of high temperature processes are employed to convert organic materials into syngas or into compounds that are more acceptable for discharge into the environment. Organic materials are any materials that contain carbon which include but are not limited to petrochemical streams, refinery streams, crude oil, natural gas, coal, polymeric wastes, municipal wastes, toxic and hazardous wastes, biomass, medical wastes, and automobile wastes. Non-limiting examples of processes that can be used for such conversion of such organic materials include incineration, combustion, pyrolysis, thermolysis, decomposition, gasification, and steam reformation.

It is known in the art to incinerate certain types of organic materials in order to utilize its energy content for the production of electrical energy; for the generation of heat; to destroy toxic and hazardous organic components; or to reduce drastically the volume of the material to be disposed. Incineration is generally referred to as the exothermic conversion of organic materials by combustion (burning) to ash, carbon dioxide, and water vapor.

Incineration facilities for such organic materials typically require complicated flue or smoke gas purification due to the danger that highly toxic chlorine-containing organic substances, such as, dioxins and furans, may be formed. These highly toxic chlorine-containing organic substances may be formed from chlorine compounds in the organic material feedstock during combustion or in the cooling phase of primary combustion gases. In addition, nitrogen from the atmosphere can combine with oxygen in the incinerator to produce NOx which are pollutants. Furthermore, there is a growing resistance from both the pubic and regulatory agencies toward incineration because of the high volume of gaseous discharge, a part of which may be toxic. Also, incineration inherently involves the use of open flames which can be hazardous at certain locations, such as at petroleum refineries and chemical plants.

Changing regulations, inspired by public concerns aimed at safeguarding the environment, have become the catalyst for the development of advanced technologies designed to minimize the amount of waste by separating waste components and recovering reusable components. These technologies must, at the same time, reduce fugitive discharges below regulatory tolerance levels while maintaining an effective monitoring network.

A number of treatment techniques have been employed to break down the organic materials while decreasing or eliminating certain pollutants discharged to the environment such as NOx, dioxins, and furans. In an effort to address the concerns of incineration, for example, the process of gasification has been developed as a technology solution for solving the inherent problems of incineration. Gasification is generally known as a process wherein organic materials are converted into a syngas in the absence or presence of free oxygen.

In particular, one type of gasification technology that is being developed for solving the inherent problems of incineration is steam reformation. Steam reformation is considered a subcategory of gasification and involves the high temperature chemical breakdown of organic compounds in a low oxygen or oxygen-free environment. The steam reformation process is an endothermic process whereby organic materials in combination with water vapor are converted into a syngas. As an endothermic process, steam reforming thereby requires an energy input to drive the steam reformation reaction.

In an effort to supply heat to drive the steam reformation reaction, various methods of heating have been employed, including gas fired heat, electrical resistance, microwaves, and steam. Most steam reformation processes use gas fired heaters wherein the gas fired heaters create an emission point that may or may not be regulated by the EPA or state environmental agency. Gas fired heaters suffer from several shortcomings, such as an undesirable hot environment; a high level of operator skill; relatively poor temperature control; and an open flame. In an effort to address these concerns, a number of alternative heat sources have been employed in which the organic material is heated without use of combustion or open flames. In particular, these techniques employ microwaves or electrical resistance.

An example of heating by electrical resistance is found in U.S. Pat. No. 5,184,950 to Fraysse et al. which discloses a process and device for the decontamination of solid material that employs resistance heating elements to heat a treatment enclosure at a temperature of about 500° C. During treatment, a vacuum is maintained within the enclosure, and a heated inert gas may be pumped into the enclosure, depending upon the type of material to be treated. Unfortunately, electrical resistance heating may be inefficient and costly and may not efficiently heat materials to a high enough temperature to drive either a pyrolysis or steam reformation reaction. On the other hand, induction heating has the potential of providing a more efficient alternative to resistance heating. However, until this invention there was no efficient induction heating techniques employing the combination of pyrolysis and steam reformation of organic materials.

An example of induction heating is found in U.S. Pat. No. 5,710,360 to Self et al. which discloses a thermal desorption system for decontaminating various types of materials. During decontamination, induction heating is employed to heat the thermal desorption chamber so that certain target compounds are volatized and removed from the waste materials. While this thermal desorption system employs induction heating, the system was not designed for the steam reformation of organic materials.

An example of microwave heating is found in U.S. Pat. No. 6,398,921 to Moraski which discloses a gasification reaction driven by a high intensity microwave field. The microwave gasifier enables the endothermic gasification process wherein target organic materials are converted into a usable combustable gas, such as syngas. Unfortunately, it is difficult to create a uniform energy distribution with microwave heating. Also, microwave heating cannot easily be used to heat all materials because not all materials behave the same to the microwave wave length. Therefore, induction heating provides a more efficient alternative to microwave heating because induction heating can provide a uniform heat distribution regardless of the organic material being heated.

Another advantage of inductive heating is the potential for shorter residence times of the steam reformation reaction.

Certain methods of inductively heating a steam reformer may create a significantly shorter residence time as compared to the related art. For example, inductively heating a steam reformer can result in a residence time of about ¼ second whereas any of the non-induction heating technology disclosed in the related art may have a higher residence time of about 2 seconds or more.

In view of the foregoing, it is apparent that a need exists in the art for an improved process for decontamination and steam reforming of organic materials.

SUMMARY

In accordance with the present invention there is provided a steam reforming system comprising:
(a) a kiln comprising a kiln inlet for receiving a feedstock, a conveyor for transporting said feedstock through said kiln, a first kiln outlet for a gaseous product and a second kiln outlet for a particulate product;
(b) a steam reforming reactor comprising a reformer tube; a reactor inlet in fluid communication with said first kiln outlet for gaseous product of said kiln; and a reactor outlet for a gaseous product, and
(c) an inductive heating means contiguous to said reformer tube for providing heat to said reactor.

Also in accordance with the present invention there is provided a method of steam reforming organic materials comprising the steps of:
(a) charging feedstock into a kiln;
(b) heating said feedstock in said kiln to a suitable temperature wherein feedstock is at least partially converted into a pyrolysis gas;
(c) transferring said pyrolysis gas from said kiln into a steam reforming reactor wherein said steam reforming reactor comprises at least one reformer tube, at least one thermal transmitter, and at least one induction coil;
(d) introducing steam into said steam reforming reactor;
(e) feeding said pyrolysis gas and said steam to said steam reforming reactor wherein said pyrolysis gas is at least partially converted into syngas; and
(f) heating said steam reforming reactor with said least one induction coil.

In a preferred embodiment, the feedstock is selected from materials that include but are not limited to petrochemical streams, refinery streams, crude oil, natural gas, coal, polymeric wastes, municipal wastes, toxic and hazardous wastes, biomass, medical wastes, and automobile wastes.

These and other features, aspects, and advantages of the present invention will become better understood with regard to the following description, appended claims, and accompanying drawings where:

DETAILED DESCRIPTION OF THE PREFERRED EMBODIMENTS

Preferred embodiments of the present invention will now be described with reference to the attached drawings.

The present invention relates to a system and method for converting organic materials into syngas. Non-limiting examples or organic materials that can be used in the practice of the present invention include petrochemical streams, petroleum streams, refinery streams, natural gas, crude oil, coal, polymeric wastes, municipal wastes, toxic and hazardous wastes, biomass, medical wastes, and automobile wastes. Syngas is produced from such organic materials by the practice of the present invention by way of both pyrolysis and steam reformation wherein the process is inductively heated to provide the energy necessary for either the pyrolysis process or the steam reformation reactions or both.

"Pyrolysis" is herein defined as the chemical degradation that is substantially caused by thermal energy. "Gasification" is herein defined as a process wherein organic materials are at least partially converted to a syngas in the absence or presence of free oxygen. "Steam reformation" is a form of gasification and is herein defined as a substantially endothermic reaction whereby organic materials in combination with steam are converted to syngas either in the presence or absence of free oxygen. "Syngas" is short for "synthetic gas" and is herein defined as a usable combustion gas composed mostly of hydrogen and carbon monoxide with lesser amounts of methane and carbon dioxide. "Tube" is herein defined as a conduit consisting of a hollow object—regardless of geometric shape—used to hold and/or conduct objects or liquids or gases.

Figure 1:
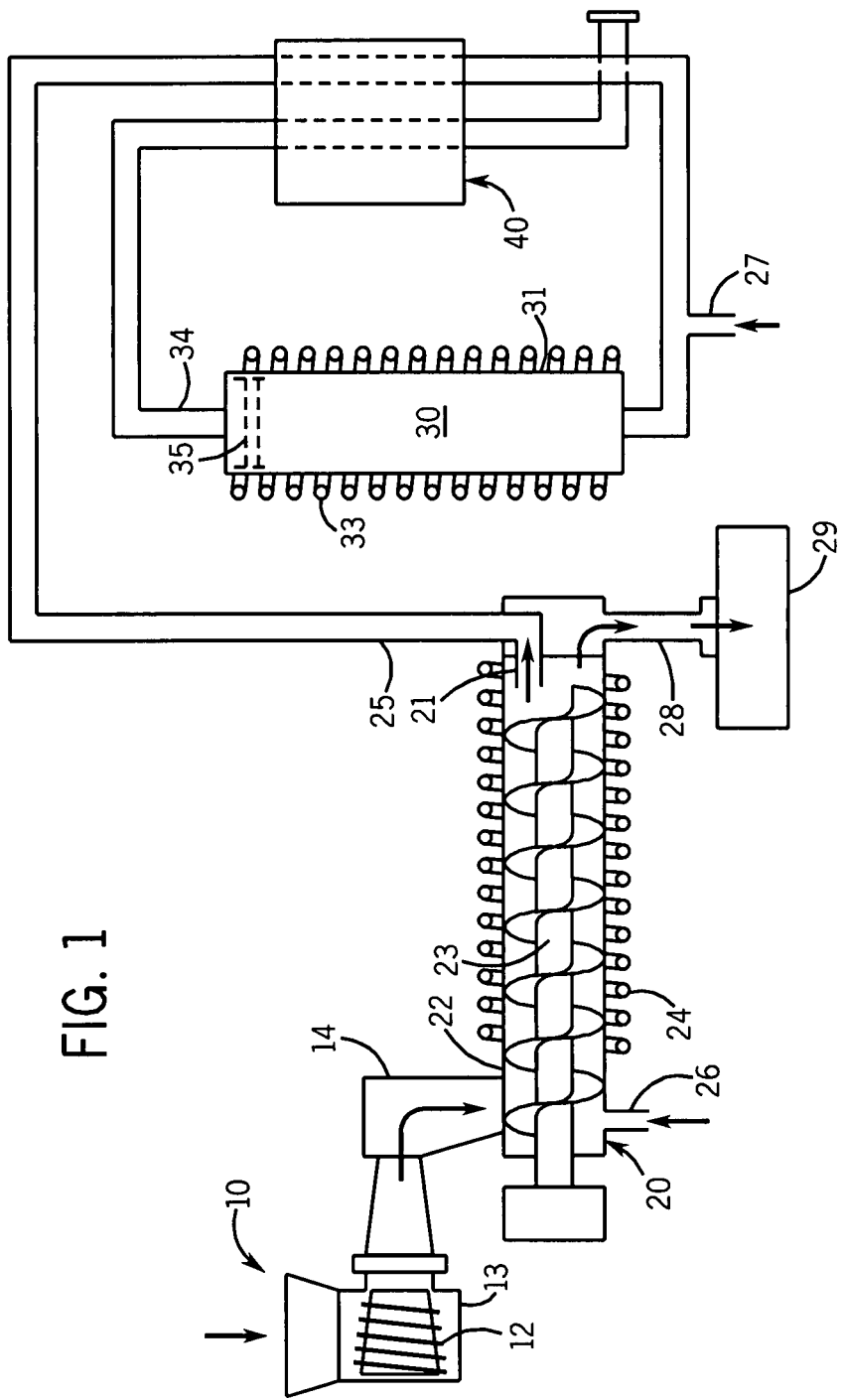
FIG. 1 is a schematic diagram of a preferred embodiment of the present invention.
Figure 2:
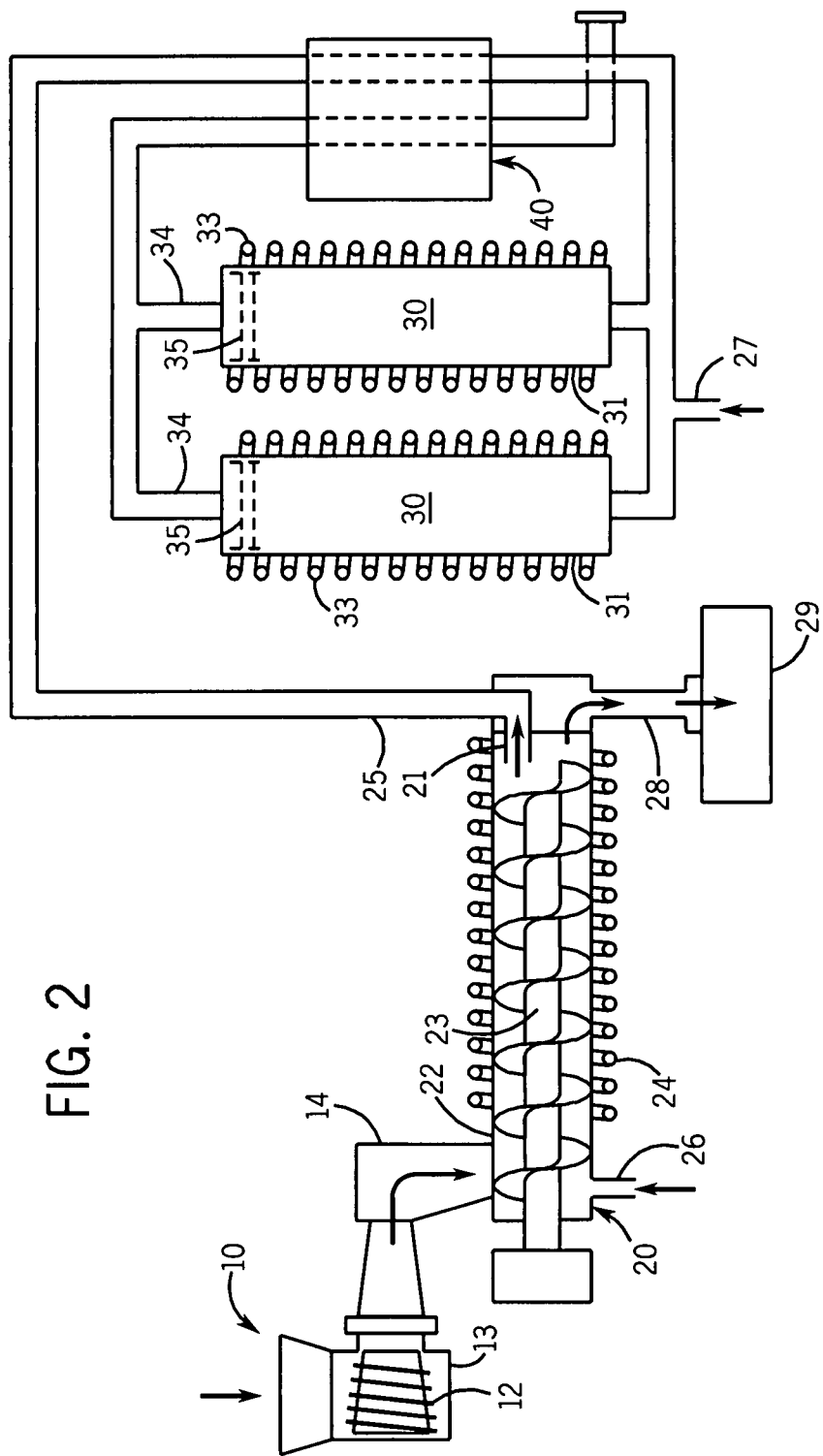
FIG. 2 is a schematic diagram of a preferred embodiment of the present invention.

Turning now to a more detailed consideration of one embodiment of the present invention, FIG. 1 and FIG. 2 illustrates a system for steam reforming organic materials.

The system and method depicted in FIG. 1 and FIG. 2 involves loading feedstock into feed system 10 wherein the feedstock is conveyed through feed system 10. Feed system 10 is preferably sealed, self-contained, and purged with steam to ensure that atmospheric gases such as oxygen are not substantially introduced into kiln 20. Feed system 10 is designed so that the oxygen content within feed system 10 is effectively low. By "effectively low," we mean low enough to avoid combustion reactions that would substantially alter the energy content of syngas 34 produced during steam reformation. Such low oxygen levels are preferably below about 3% by volume, more preferably below about 2% by volume, and most preferably below about 1% oxygen by volume.

Feed system 10 can contain any suitable means capable of transporting the feedstock to kiln 20. In one embodiment, the transport means of feed system 10 comprises auger 12 and extruder tube 13. Auger 12 and extruder tube 13 are preferably of a tapered design. Auger 12 comminutes the feedstock to a size that can be easily moved through extruder tube 13. The feedstock exits extruder tube 13 and passes into feed chamber 14 located at the feed end of kiln 20. A basic neutralizing agent such as lime can optionally be added to the feedstock to neutralize at least a portion of any acids that are formed in kiln 20.

In FIGS. 1 and 2, the kiln 20 is illustrated as comprising at least one susceptor tube 22, at least one auger 23, and at least one induction coil 24 such that kiln 20 is inductively heated. In practice, however, kiln 20 may be heated by any conventional means. Furthermore, susceptor tube 22 may be inductively heated wherein induction coil 24 is spaced such that more energy is input at the inlet side of susceptor tube 22 than at the outlet side. In addition, a preferred operating temperature range of kiln 20 is about 1200° F. to about 1800° F., therefore, the melting temperature of the susceptor tube 22 is preferably greater than about 1200° F. and more preferably greater than about 1800° F. and most preferably greater than about 2300° F.

In one embodiment, there may be more than one susceptor tube 22 arranged in either in a series or parallel configuration. In addition, there may be more than one auger 23 located within kiln 20 arranged either in a series or parallel configuration within the susceptor tube.

Susceptor tube 22 is preferably constructed of a material with an effective electrical resistivity and thermal conductivity properties suitable for being inductively heated. The effective resistance of the susceptor tube 22 should preferably be greater than about 100 μohm-cm at a temperature of 1800° F. Also, it is preferable that the effective thermal conductivity of susceptor tube 22 be high enough to provide efficient heat transfer between it and the material to be treated. The effective thermal conductivity will preferably be greater than or equal to about 195 BTU-in/ft$^2$-hr-° F. at the tube's preferred operating temperature of 1800° F.

The susceptor tube material preferably has a relatively low mean coefficient of thermal expansion which is useful for preventing the tube from expanding too much during operation where it could not be accommodated by mechanical supports which are employed to support tube 22. The mean coefficient of thermal expansion is preferably below about 9.5 μin/in-° F.

Any suitable construction material can be used for the susceptor tube 22 including metallic and non-metallic materials. Preferred construction materials include high temperature alloys including but not limited to nickel based super alloys, such as Haynes® 230™ Alloy or INCONEL alloy 600, both of which have a melting temperature in excess of about 2300° F. Not only do these materials satisfy the high melting temperature requirements, but they also have relatively high electrical resistance (≥ about 100 μohm-cm@1800° F.) and relatively high thermal conductivity (≥ about 195 BTU-in/ft$^2$-hr-° F.@1800° F.). These materials also have a low mean coefficient of thermal expansion which is important from a structural standpoint considering the high operating temperatures involved. As previously mentioned, if the thermal expansion coefficients are too high, susceptor tube 22 may expand too much during heating to be structurally manageable.

It should be understood, however, that any material or combination of materials that meet the above referenced melting point, thermal conductivity, and electrical resistivity can be used for constructing susceptor tube 22. One such material that meets these parameters is silicon carbide or a composite thereof. In addition, other materials, metals, or metal alloys can be used as well, if one were willing to relax the resistivity and thermal conductivity parameter requirements and sacrifice operational efficiency.

A conveyor will be provided for transporting and simultaneously mixing the feedstock through kiln 20 while mixing feedstock within kiln 20. In addition to transporting the feedstock through kiln 20, the conveyor may also have the benefit of increasing the rate of heat transfer, pyrolysis, steam reformation, and vaporization of the organic materials. Such conveyor may be of any design or configuration suitable for transporting feedstock through kiln 20 such as an auger or rotating kiln design. Kiln 20 is preferably a non-rotating design wherein feedstock is conveyed through kiln 20 using an auger wherein auger 23 is a variable speed, reversible ribbon auger.

The temperature inside kiln 20 is preferably maintained between about 1200° F. and about 1800° F. As the feedstock is heated inside kiln 20, it is at least partially converted into pyrolysis gas and residue. "Pyrolysis gas" is herein defined as a gas comprised of both vaporized and decomposed organic compounds which originated from the organic material feedstock.

In the embodiment of FIG. 1, pyrolysis gas is moved out of kiln 20 by way of at least one evacuation tube 21 wherein evacuation tube 21 may run substantially the length of susceptor tube 22. Evacuation tube 21 may be configured with multiple openings to allow pyrolysis gas to enter from multiple locations. Kiln 20 has a first outlet wherein pyrolysis gas is transferred out of kiln 20 via evacuation tube 21 and a pyrolysis line 25. The pyrolysis gas leaves kiln 20 via evacuation tube 21 which is in fluid communication with pyrolysis line 25. In turn, the pyrolysis gas flows through the pyrolysis line 25 which is in fluid communication with at least one steam reforming reactor 30 suitable for steam reforming the pyrolysis gas. There may be more than one steam reforming reactor 30 in parallel as shown in FIG. 2, or the steam reforming reactors may be operated in series (not shown). Kiln 20 also has a second outlet wherein residue and/or particulates are transferred via particulate line 28 to particulate receiver 29. It will be understood that the pyrolysis gas can be conducted from kiln 20 without use of evacuation tube 21. In such a case the pyrolysis gas will exit kiln 20 directly into pyrolysis line 25 and will be conducted to steam reforming reactor 30.

In addition, steam is preferably added to kiln 20 via first steam line 26 to purge atmospheric gases from inside kiln 20. If steam is added to kiln 20, at least partial steam reforming may occur in kiln 20, therefore, the exiting pyrolysis gas from kiln 20 may be comprised of vaporized organic compounds, decomposed organic compounds, syngas, and steam.

Figure 3:
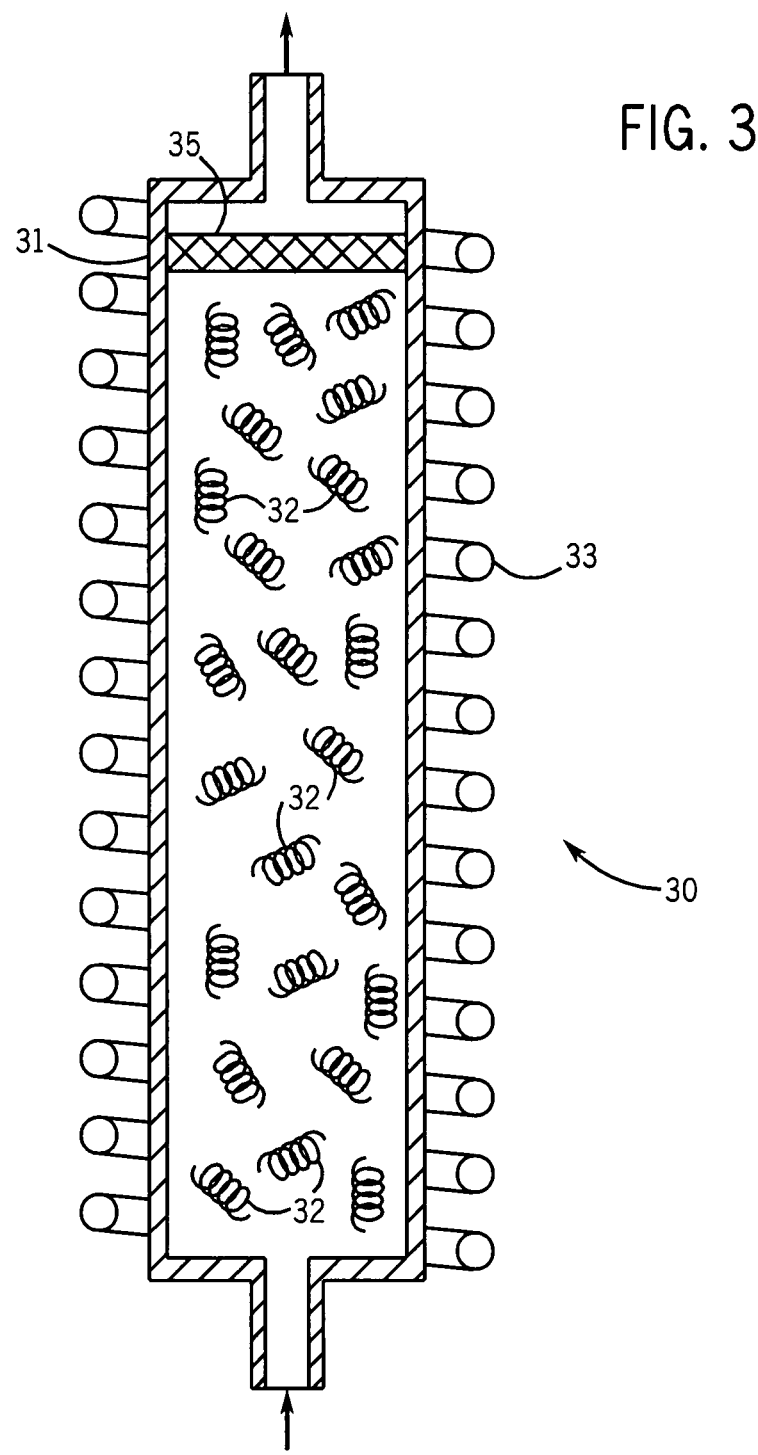
FIG. 3 is a schematic diagram of a preferred embodiment of the steam reforming reactor.

Focus will now be on FIG. 3 to describe one embodiment of the design of steam reforming reactor 30. In this embodiment, steam reforming reactor 30 contains at least one substantially non-electrically conductive reformer tube 31 wherein the practical effect is to have reformer tube 31 be substantially invisible to the induction field. Reformer tube 31 is substantially made of a material such as a ceramic material or a composite thereof. Each reformer tube 31 is at least partially surrounded by at least one induction coil 33 capable of providing sufficient heat to drive the steam reformation reaction.

Reformer tube 31 is preferably at least partially filled with thermal transmitters 32 which include, but are not limited to, geometric structures made of a material that has a high electrical resistivity, a high melting point, and a thermal conductivity. Preferably, the thermal transmitters will have an electrical resistance higher than about 100 μohm-cm at 1800° F. and a thermal conductivity higher than about 195 BTU-in/ft$^2$-hr-° F. at 1800° F. The preferred melting point of thermal transmitters 32 is higher than about 2000° F., the more preferred is higher than about 2500° F., and the most preferred is higher than about 3000° F. The preferred material for the thermal transmitters 32 is a material that meets the above criteria for electrically resistivity, melting point, and thermal conductivity such as silicone carbide or a composite thereof. It is also preferred that the thermal transmitters 32 be made of a substantially non-magnetizable material.

Thermal transmitters 32 receive electromagnetic energy from induction coil 33 which preferably surrounds at least a portion of each reformer tube 31. Preferably, the induced electromagnetic energy is transmitted at an effective frequency that allows the energy to substantially penetrate reformer tube 31 wherein the induction energy transmits substantially throughout the volume of thermal transmitters 32 so that the temperature of the thermal transmitters may be as uniform as possible. As thermal transmitters 32 absorb the induced electromagnetic energy, they become heated to an effective temperature that is sufficient to drive the steam reformation reaction. Thermal transmitters 32 are preferably kept so that the operating temperature of the steam reforming reactor is between about 1750° F. and 3000° F. The heating properties of thermal transmitters 32 are attributable to their specific electrical conductivity and resistivity properties.

Thermal transmitters 32 can be any suitable shape and size that will fit into reformer tube 31 of steam reforming reactor 30. The suitable shape and size will be tailored to each application and will depend on such factors as required flow rate through the steam reforming reactor 30 and the required surface area of the thermal transmitters 32. It is preferred that the thermal transmitters 32 be of a cork screw shape about one inch in diameter and about three inches in length. It is also preferred that the thermal transmitters will be randomly distributed throughout reformer tube 31 of the steam reforming reactor 30. Other shapes of thermal transmitters 32 that may be utilized in the steam reforming reactor may include but are not limited to: (a) rasching rings; (b) Pall rings; (c) Berl saddles; and (d) Intalox saddles, which are all conventional shapes for tower packings.

Thermal transmitters 32 may also be of a structured packing design wherein the structured packing will be comprised of an ordered geometry rather than a random packing configuration. Furthermore, the thermal transmitter 32 configuration can also include a combination of structured and random packings.

In FIG. 1 and FIG. 2, second steam line 27 is introduces steam into steam reforming reactor 30 in combination with pyrolysis gas line 25 resulting in a pyrolysis gas/steam mixture. However, steam and pyrolysis gas can also be injected separately into the reactor at any suitable location. The ratio of steam to pyrolysis gas can be regulated to achieve various qualities of syngas that is collected via syngas line 34. The residence time, quantity of steam, and operating temperature of steam reforming reactor 30 are predetermined and preferably controlled by a computer based control system.

As the pyrolysis gas/steam mixture passes through reformer tube 31, it contacts thermal transmitters 32 wherein the pyrolysis gas/steam mixture is thoroughly blended and heated to elevated temperatures. The design of steam reforming reactor 30 allows the pyrolysis gas an effective residence time at reactor temperatures to react with steam to form syngas.

Thermal transmitters 32 may be of sufficient quantity and shape to disturb the flowing gases sufficiently to separate or remove any entrained solid particles carried by the gas stream thus acting as a particulate scrubber. Organic particulates captured in steam reforming reactor 30 will be sufficiently heated to further react with the steam and contribute to the syngas production.

In another preferred embodiment, reformer tubes 31 are fitted with filter 35. Filter 35 is installed within reformer tube 31 at a location toward the outlet of reformer tube 31. Filter 35 is made of a material that is compatible with, or the same as, thermal transmitters 32, such as a material with an electrical resistance higher than about 100 μohm-cm at 1800° F. and a thermal conductivity higher than about 195 BTU-in/ft$^2$-hr-° F. at an operating temperature of 1800° F. The preferred melting point of filter 35 is higher than about 2000° F., the more preferred is higher than about 2500° F., and the most preferred is higher than about 3000° F. The preferred material for filter 35 is silicone carbide or composite thereof.

Filter 35 will also preferably be comprised of a honeycomb structure capable of filtering at least a portion of the particulates, such as organic particulates, that may have passed through steam reforming reactor 30 without having reacted with the steam to form syngas. Filter 35 may also be of any effective structure that is suitable for removing such particulates. Filter 35 may also be inductively heated so that any organic particulates that are filtered and trapped in filter 35 may react with steam to form syngas thereby creating a more efficient steam reforming reactor 30. Filter 35 may help reduce the load on any downstream syngas filtration system.

In FIG. 1 and FIG. 2, the pyrolysis gas preferably passes through heat exchanger 40 wherein it is preheated with syngas via syngas line 34 as the heating medium. This has the desired effect of preheating the pyrolysis gas for reforming while at the same time cooling the syngas. Heat exchanger 40 is preferably a radiant tube heat exchanger although any suitable conventional design can be used. Such designs are well known to those having ordinary skill in the art.

The product syngas of this invention is preferably cleaned; compressed; and combusted to generate electricity or to generate heat or both. Alternatively, the syngas can be used in a fuel cell to generate electricity. Either method can create electricity which can be used to power the induction coils and/or transmitted to on-site or off-site facilities. Furthermore, the syngas can be transferred to a processing facility such as a chemical plant or refinery which can use the components of the syngas in the production of other chemical products, such as lube basestocks and transportation fuels.

In another embodiment, thermal transmitters 32 may be coated or impregnated with a catalyst to help drive a desired chemical reaction, including but not limited to steam reforming reactions.

Insofar as the description above and the accompanying drawings disclose any additional subject matter that is not within the scope of the claims below, the inventions are not dedicated to the public and the right to file one or more applications to claim such additional inventions is reserved.

There are of course other alternate embodiments which are obvious from the foregoing descriptions of the invention, which are intended to be included within the scope of the invention, as defined by the following claims.

What is claimed is:

1. A steam reforming system comprising:
   a) a kiln, comprising a susceptor tube; a kiln inlet for receiving a feedstock; a conveyor for transporting said feedstock through said kiln;
   a first kiln outlet for a gaseous product; and a second kiln outlet for a particulate product;
   b) a steam reforming reactor comprising a reformer tube; a reactor inlet in fluid communication with said first kiln outlet for gaseous product of said kiln; and a reactor outlet for a gaseous product;
   c) an inductive heating means contiguous to said reformer tube for providing heat to said steam reforming reactor; and
   d) said steam reforming reactor further comprises a filter installed within said reformer tube at a location toward the reactor outlet of said reformer tube wherein said filter is capable of providing heat by receiving electromagnetic energy from said inductive heating means.

2. The steam reforming system of claim 1 further comprising an inductive means contiguous to said susceptor tube for providing heat to said kiln.

3. The steam reforming system of claim 1 further comprising:
   a heat exchanger in fluid communication with both said reactor outlet and said first kiln outlet wherein said heat exchanger is capable of transferring heat from said gaseous product exiting said steam reforming reactor to said gaseous product exiting said kiln.

4. The steam reforming system of claim 1 wherein said kiln is comprised of:
- a susceptor tube for receiving feedstock to be heated wherein said susceptor tube is made from a material with an effective electrical resistivity and thermal conductivity properties suitable for being inductively heated;
- at least one induction coil at least partially surrounding said susceptor tube for providing heat to said tube; and
- at least one power supply for supplying electrical current to said at least one induction coil to heat said susceptor tube.

5. The steam reforming system of claim 4 wherein said kiln further comprises an evacuation tube in fluid communication with said first kiln outlet for removing said gaseous product from said susceptor tube.

6. The steam reforming system of claim 1 wherein said steam reforming reactor comprises:
- a reformer tube comprising an inlet in fluid communication with said first kiln outlet for receiving gaseous product from said kiln to be heated; and
- at least one thermal transmitter placed in said reformer tube wherein said inductive heating means provides energy to heat said at least one thermal transmitter.

7. A steam reforming system of claim 6 wherein said reformer tube is comprised of a substantially non-electrically conductive material.

8. A steam reforming system of claim 6 wherein said reformer tube is comprised of ceramic material or a composite thereof.

9. A steam reforming system comprising:
- a) a heated kiln for receiving feedstock to be at least partially pyrolyzed, wherein said kiln comprises:
  - i) a kiln inlet for receiving a feedstock;
  - ii) a susceptor tube for receiving feedstock, to be heated to a suitable temperature to at least partially pyrolyze said feedstock;
  - iii) a means to transport said feedstock through said susceptor tube;
  - iv) at least one induction coil at least partially surrounding said susceptor tube for heating said susceptor tube;
  - v) a first kiln outlet for a gaseous product exiting said kiln;
  - vi) a second kiln outlet for a particulate product exiting said kiln;
  - vii) at least one power supply for supplying current to said at least one induction coil to heat said susceptor tube; and
  - viii) a steam inlet for introducing steam into said kiln.
- b) a feed system for charging said feedstock to said kiln wherein said feed system comminutes said feedstock prior to being charged to said kiln;
- c) a steam reforming reactor for receiving said gaseous product from said kiln wherein said steam reforming reactor comprises:
  - i) a reactor inlet in fluid communication with said first kiln outlet;
  - ii) a reactor outlet for a gaseous product exiting said reactor;
  - iii) a reformer tube wherein said tube of said steam reforming reactor is comprised of a substantially non-electrically conductive material;
  - iv) at least one induction coil at least partially surrounding said reformer tube for heating said reformer tube;
  - v) at least one power supply for supplying current to said at least one induction coil to heat said steam reforming reactor;
  - vi) at least one thermal transmitter placed into said tube wherein said at least one thermal transmitter receives electromagnetic energy from said at least one induction coil and wherein said at least one thermal transmitter comprises a material having an electrical resistance higher than about 100 μohm-cm at 1800° F.; and
  - vii) a filter installed within said reformer tube at a location toward the reactor outlet of said reformer tube wherein said filter is capable of providing heat by receiving electromagnetic energy from said at least one induction coil.

10. The steam reforming system of claim 9 wherein said thermal transmitter is made of a substantially non-magnetizable material.

11. The steam reforming system of claim 10 further comprising a heat exchanger in fluid communication with both said reactor outlet and said first kiln outlet wherein said heat exchanger is capable of transferring heat from the gaseous product exiting said steam reforming reactor to said gaseous product exiting from said kiln.

12. A steam reforming system comprising:
- a) a kiln comprising a kiln inlet for receiving a feedstock, a conveyor for transporting said feedstock through said kiln, a first kiln outlet for a gaseous product and a second kiln outlet for a particulate product;
- b) a means for charging said feedstock into said kiln;
- c) a means for heating said feedstock in said kiln to a suitable temperature wherein feedstock is at least partially converted into a pyrolysis gas;
- d) a means for transferring said pyrolysis gas from said kiln into a steam reforming reactor wherein said steam reforming reactor comprises at least one reformer tube;
- e) a means for introducing steam into said steam reforming reactor;
- f) a means for feeding said pyrolysis gas and said steam into said steam reforming reactor wherein said pyrolysis gas is at least partially converted into syngas;
- g) a means for inductively heating said steam reforming reactor with at least one induction coil wherein at least one thermal transmitter is placed into said reformer tube; and
- h) said steam reforming reactor further comprises a filter installed within said reformer tube at a location toward the reactor outlet of said reformer tube wherein said filter is capable of providing heat by receiving electromagnetic energy from said inductive heating means.

* * * * *